US009481320B2

(12) United States Patent
Bach et al.

(10) Patent No.: US 9,481,320 B2
(45) Date of Patent: Nov. 1, 2016

(54) FRONT PILLAR EXTERIOR GARNISH FOR A VEHICLE BODY

(71) Applicant: Honda Motor Co., Ltd., Tokyo (JP)

(72) Inventors: Edward Bach, Galloway, OH (US); Kurtis Ray Horner, Marysville, OH (US); Adam J. Rompage, Dublin, OH (US); Anthony Ordonio, Jr., Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/813,360

(22) Filed: Jul. 30, 2015

(65) Prior Publication Data

US 2016/0039359 A1 Feb. 11, 2016

Related U.S. Application Data

(60) Provisional application No. 62/034,407, filed on Aug. 7, 2014.

(51) Int. Cl.
 *B60R 13/00* (2006.01)
 *B60R 13/04* (2006.01)
 *B62D 25/04* (2006.01)
(52) U.S. Cl.
 CPC ............... *B60R 13/00* (2013.01); *B60J 10/84* (2016.02); *B60R 13/04* (2013.01); *B62D 25/04* (2013.01)
(58) Field of Classification Search
 CPC ........... B62D 25/04; B60J 1/02; B60J 10/70; B60J 10/84; B60R 13/04; B60R 13/06; B60R 13/00

USPC .......... 296/193.065, 193.06, 193.09, 203.01, 296/203.02, 203.03, 39.1, 201, 84.1, 93, 296/96.21, 1.08
See application file for complete search history.

(56) References Cited

U.S. PATENT DOCUMENTS

| | | | | |
|---|---|---|---|---|
| 4,355,843 A * | 10/1982 | Murakami | ............. | B62D 25/07 296/201 |
| 4,653,801 A * | 3/1987 | Shirasu | ................... | B60R 13/06 296/202 |
| 5,163,730 A | 11/1992 | Welch | | |
| 5,575,500 A | 11/1996 | Mimura et al. | | |
| 5,772,277 A | 6/1998 | Fukuda | | |
| 5,988,733 A | 11/1999 | Kamo et al. | | |
| 6,854,786 B2 * | 2/2005 | Berglund | ................ | B60R 13/04 296/146.9 |
| 7,344,186 B1 | 3/2008 | Hausler et al. | | |
| 7,434,870 B2 * | 10/2008 | Kinoshita | ................ | B60J 10/70 296/193.06 |

(Continued)

FOREIGN PATENT DOCUMENTS

| | | |
|---|---|---|
| JP | 4147797 | 9/2008 |
| JP | 4244558 | 3/2009 |

(Continued)

*Primary Examiner* — Gregory Blankenship
(74) *Attorney, Agent, or Firm* — Rankin, Hill & Clark LLP

(57) ABSTRACT

A vehicle body assembly includes a front pillar extending at an incline rearwards and upwards to form a part of a door opening. The front pillar includes a tubular structural member. The structural member defines a vehicle exterior-side wall section and a passenger compartment-side wall section. A windshield is adhered to the vehicle exterior-side wall section of the structural member. A pillar outer cover is disposed outwardly of the front pillar and is secured to the exterior-side wall section of the structural member. The pillar outer cover includes an edge section overlapping and sealingly engaged to the windshield.

20 Claims, 3 Drawing Sheets

(56) References Cited

U.S. PATENT DOCUMENTS

| | | | |
|---|---|---|---|
| 7,735,907 B2 | 6/2010 | Moore et al. | |
| 7,845,713 B2 | 12/2010 | Terai et al. | |
| 8,444,211 B2 | 5/2013 | Fujita | |
| 8,454,083 B2 | 6/2013 | Dimitriou et al. | |
| 8,523,275 B2 | 9/2013 | Jorgensen et al. | |
| 8,622,465 B2 * | 1/2014 | Fujita | B62D 21/152 296/193.06 |
| 8,662,568 B2 | 3/2014 | Weigl et al. | |
| 9,302,710 B2 * | 4/2016 | Bach | B62D 25/06 |
| 2001/0002762 A1 * | 6/2001 | Enomoto | B62D 25/04 296/203.02 |
| 2001/0040392 A1 * | 11/2001 | Yoshida | B62D 25/04 296/203.02 |
| 2002/0057003 A1 * | 5/2002 | Yoshida | B62D 21/15 296/187.04 |
| 2003/0227192 A1 * | 12/2003 | Okamoto | B60J 1/02 296/96.22 |
| 2006/0138807 A1 * | 6/2006 | Hasegawa | B62D 25/04 296/193.06 |
| 2010/0060037 A1 * | 3/2010 | Terai | B60J 1/10 296/193.06 |
| 2013/0193716 A1 | 8/2013 | Kurokawa | |
| 2013/0241238 A1 | 9/2013 | Fujita | |
| 2013/0257101 A1 | 10/2013 | Shono | |
| 2014/0084631 A1 | 3/2014 | Kojima | |
| 2016/0068115 A1 * | 3/2016 | Inagawa | B60R 13/025 296/193.06 |
| 2016/0068116 A1 * | 3/2016 | Inagawa | B60R 21/213 296/193.06 |

FOREIGN PATENT DOCUMENTS

| | | |
|---|---|---|
| JP | 5001229 | 1/2010 |
| JP | 5045505 | 10/2012 |

* cited by examiner

FRONT PILLAR EXTERIOR GARNISH FOR A VEHICLE BODY

The present application claims priority to U.S. Prov. Patent App. Ser. No. 62/034,407, filed Aug. 7, 2014, the entirety of which is incorporated herein.

BACKGROUND

Front pillars (i.e., A-pillars) on a vehicle are structural members of a body frame positioned between the windshield and the front doors. The front pillars support the roof structure as well and, therefore, must provide substantial support in rollover events. At the same time, the front pillars lie within sight lines of the vehicle operator and need to have a minimal profile to allow the operator to maintain proper vision with respect to the front pillars. Thus, there can be conflicting requirements with respect to the design of the front pillars. To provide a strong structural member for the body frame, each front pillar needs to have a maximum cross-sectional configuration, yet maintain a minimal cross-section for vision purposes. Commonly, each front pillar is formed as a structural member having a closed cross-section by welding together an outer panel and an inner panel in an overlapping manner. Each of the outer panel and the inner panel typically includes a weld flange for joining the other. The weld flanges also provide for a sealing relationship with respect to both the windshield and the front door that are supported on the front pillars. However, because the weld flanges project outwardly from each front pillar, the traditional flange formation can be restrictive and can result in a correspondingly narrower field of view for the operator from within the passenger compartment.

BRIEF DESCRIPTION

In accordance with one aspect, a vehicle body assembly comprises a front pillar extending at an incline rearwards and upwards to form a part of a door opening. The front pillar includes a tubular structural member. The structural member defines a vehicle exterior-side wall section and a passenger compartment-side wall section. A windshield is adhered to the vehicle exterior-side wall section of the structural member. A pillar outer cover is disposed outwardly of the front pillar and is secured to the exterior-side wall section of the structural member. The pillar outer cover includes an edge section overlapping and sealingly engaged to the windshield.

In accordance with another aspect, a vehicle body assembly comprises a front pillar extending at an incline rearwards and upwards to form a part of a door opening. The front pillar includes a tubular structural member which is a single integrated component having a closed cross-section. The structural member defines a vehicle exterior-side wall section and a passenger compartment-side wall section. The vehicle exterior-side wall section is defined by an outer upper wall section and an outer lateral side wall section located on an outside in a vehicle body width direction. The passenger compartment-side wall section is defined by an inner lower wall section and an inner lateral side wall section located on an inside in the vehicle body width direction. A windshield is adhered directly to the outer upper wall section of the vehicle exterior-side wall section of the structural member. A pillar outer cover is disposed outwardly of the front pillar and is secured to the outer lateral side wall section of the exterior-side wall section of the structural member. The pillar outer cover includes an edge section overlapping and sealingly engaged to the windshield. No portion of the pillar outer cover extends beneath the windshield.

In accordance with yet another aspect, a front pillar structure for a vehicle body comprises a unitary, one-piece tubular structural member having an outer upper wall section, an outer lateral side wall section, an inner lower wall section and an inner lateral side wall section. A pillar outer cover is disposed outwardly of the structural member. An attachment member is adhered to the pillar inner cover and is configured to secure the pillar outer cover to the outer lateral side wall section of the structural member. The pillar outer cover is configured to overlap and sealingly engage an associated windshield adhered directly to the structural member. A pillar inner cover is disposed inwardly of the structural member. A mounting member is configured to secure the pillar inner cover to the outer lateral side wall section.

DETAILED DESCRIPTION

It should, of course, be understood that the description and drawings herein are merely illustrative and that various modifications and changes can be made in the structures disclosed without departing from the present disclosure. In general, the figures of the exemplary vehicle body are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body and front pillar disclosed herein are merely terms of art that may vary from one manufacturer to another and should not be deemed to limit the present disclosure.

Figure 1:
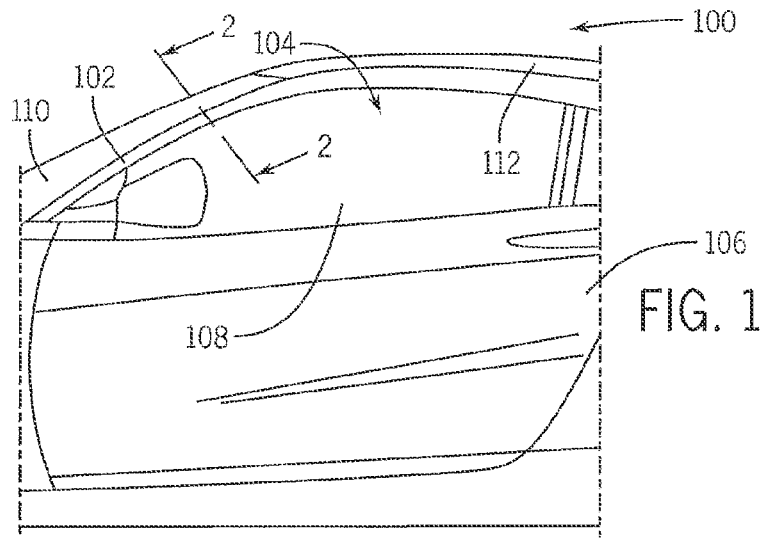
FIG. 1 is a schematic view of a front left section of a vehicle body.

Referring now to the drawings, wherein like numerals refer to like parts throughout the several views, FIG. 1 depicts a side section of a vehicle body frame 100 The vehicle body frame 100 includes left and right front pillars or A-pillars (only left front pillar 102 is visible), each front pillar extending at an incline rearwards and upwards to form a part of door opening (only left door opening 104 is visible) that is opened or closed by a front door (only left front door 106 and left front door glass 108 are depicted). A windshield 110 is mounted between the left and right front pillars, and a roof structure 112 is at least partially supported by the front pillars. Structural components of a known left front pillar 120 are reflected in FIG. 2, which is a cross-sectional view of the left front pillar 102 corresponding to line 2-2 of FIG. 1. Because the left and right known front pillars are bilaterally symmetrical to each other, a description will be given hereafter for the known left front pillar 120 only and a description for the known right front pillar will be omitted. The left front pillar 120 will hereafter be referred to simply as the known front pillar.

Figure 2:
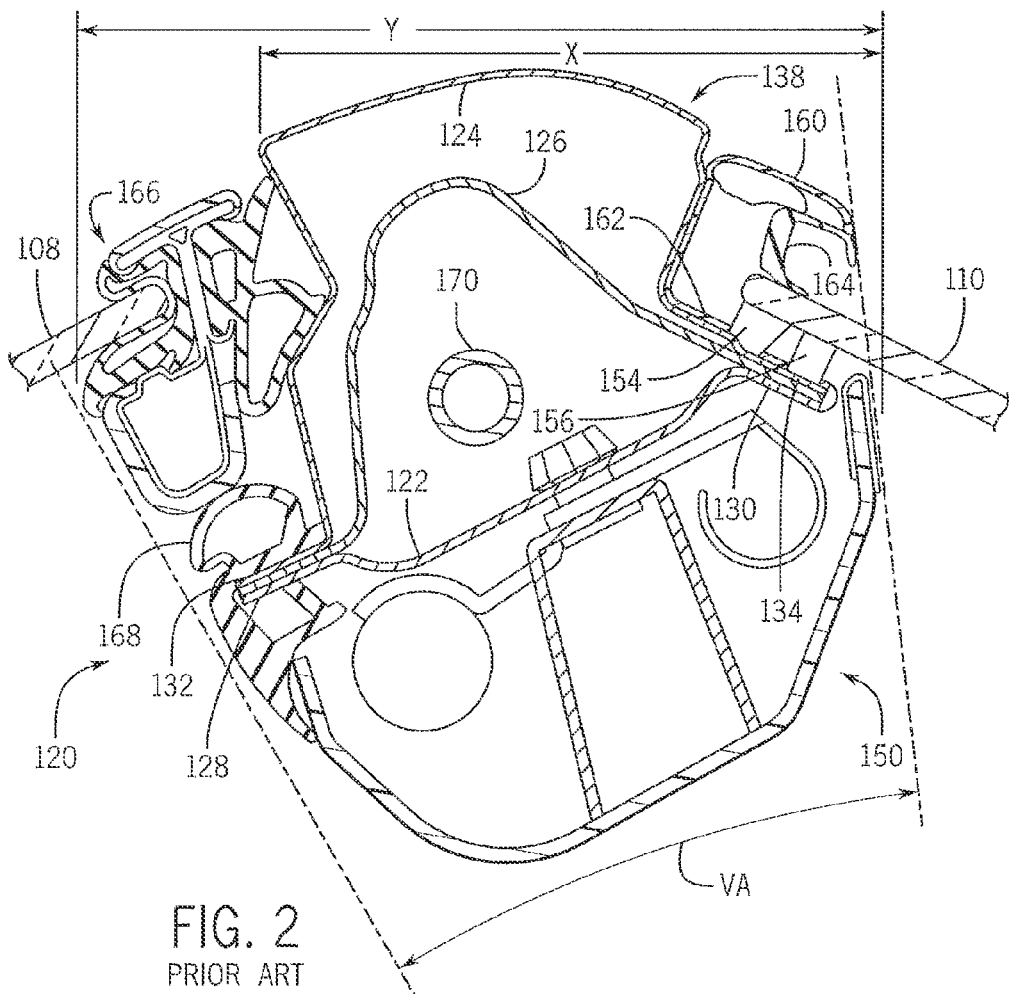
FIG. 2 is a cross-sectional view of a known front pillar taken along line 2-2 of FIG. 1.

The known front pillar 120 is typically formed of an inner panel member 122 and an outer panel member 124. A reinforcement member 126 is interposed between the inner and outer members 122, 124. The inner member 122 is formed with opposing weld flanges 128, 130. The outer member 124 has mating weld flanges 132, 134 which are welded to the flanges 128, 130 of the inner member 122 to form a generally hollow, vertically extending structural beam 138. A pillar inner cover 150 is disposed inwardly of the known front pillar 120 in the vehicle passenger compartment or cabin and is fastened to the inner member 122. The pillar inner cover 150 covers the known front pillar 120 from the inside of the vehicle cabin. The windshield 110 is adhered to the outer member 124 via an adhesive 154 and a seal 156 is located outward of the adhesive 154 to prevent the intrusion of water and debris. A garnish 160 covers a space between the windshield 110 and the outer member 124. As depicted, the garnish 160 can be C-shaped and includes a lower portion 162 located beneath the windshield 110. A seal 164 provided at an open end of the garnish and sealingly engages the windshield 110. As is further well known, a weatherseal 166 is provided between the front door 106 and the outer member 124. A separate seal 168 is connected to the mating flanges 128, 132 and sealingly engages the weatherseal 166. A sunroof drain tube 170 can extend through the structural beam 138. Dimensions of the known front pillar 120 are depicted in FIG. 2. By way of example, a standard width "X" from an edge of the garnish 160 covering the windshield 110 to an edge of the outer panel 124 is about 90 mm. A standard overall width "Y" of the known front pillar 120 is about 124 mm. This overall width is typically a distance that is dependent on the windshield construction and the joining of the weld flanges 128, 130 of the inner member 122 and the weld flanges 132, 134 of the outer member 124. The overall width also defines a visibility angle VA of the known front pillar 120 relative to the position of the operator of the vehicle.

Figure 3:
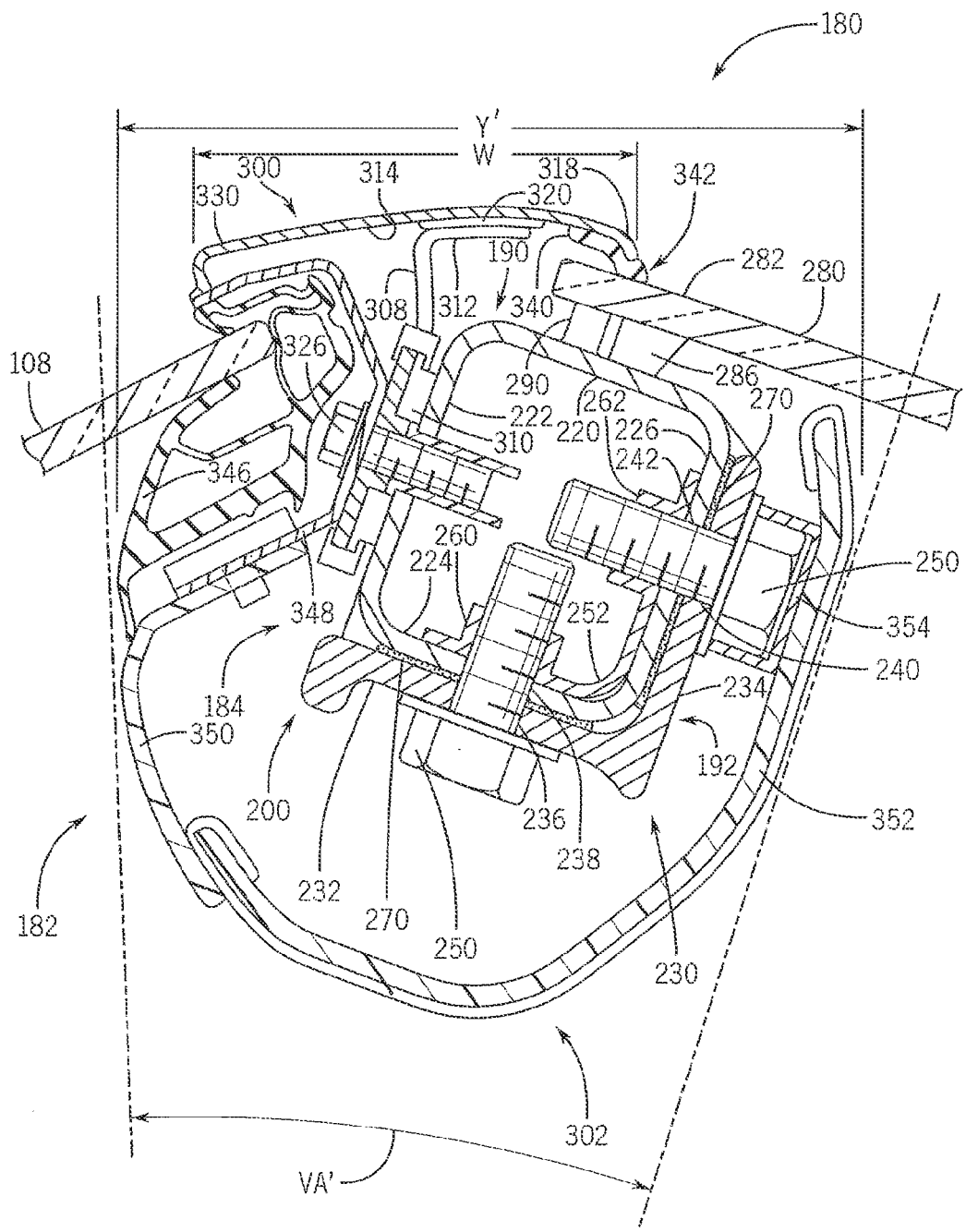
FIG. 3 is a cross-sectional view of an exemplary front pillar according to the present disclosure along line 3-3 of FIG. 4.
Figure 4:
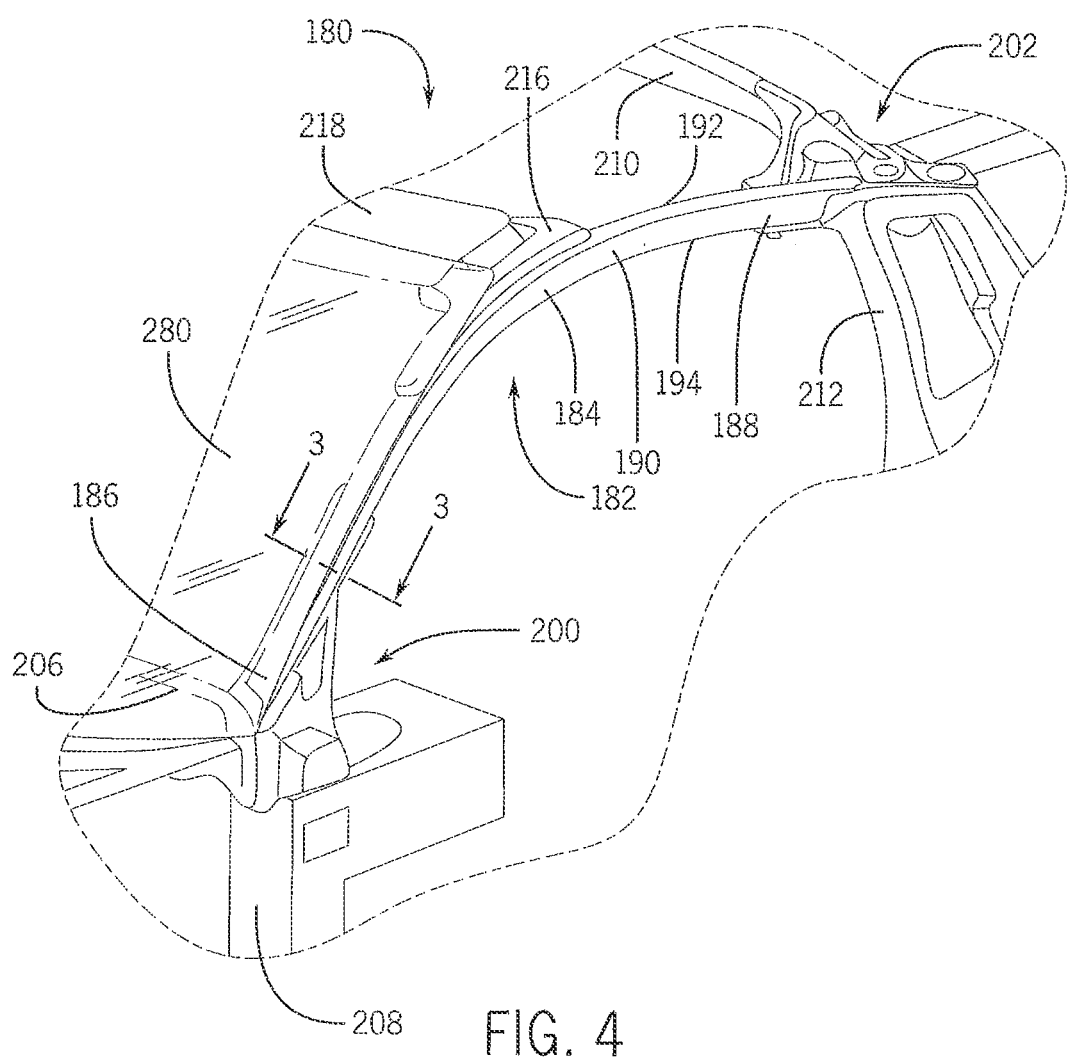
FIG. 4 is a schematic view of an exemplary vehicle body having a windshield adhered thereto.

With reference now to FIGS. 3 and 4, a vehicle body assembly 180 according to the present disclosure comprises left and right front pillars or A-pillars (only left front pillar 182 is visible), each front pillar extending at an incline rearwards and upwards to form a part of a door opening (only left door opening is visible). Again, because the left and right exemplary front pillars are bilaterally symmetrical to each other, a description will be given hereafter for the exemplary left front pillar 182 only and a description for the exemplary right front pillar will be omitted. The exemplary left front pillar 182 will hereafter be referred to simply as the front pillar. The front pillar 182 includes a tubular (i.e., hollow) structural member 184 having a first end portion 186 and an opposite second end portion 188. The structural member 184 can be a single (i.e., unitary, one-piece) integrated component having a closed cross-section and defines a vehicle exterior-side wall section 190, a passenger compartment-side wall section 192 and a passenger compartment bottom wall section 194. The vehicle body assembly 180 further comprises a first left structural node 200 and a second left structural node 202. Similarly configured first and second structural nodes are provided on a right side of the vehicle body assembly 180. As used herein, the term "structural node" is defined as a separate element of the vehicle body at which and by which two or more vehicle body portions are connected. The first structural node 200 is configured to be fastened to the passenger compartment-side wall section 192 and the passenger compartment bottom wall section 194 at the first end portion 186 of the structural member 184. The second structural node 202 is configured to be fastened to the passenger compartment-side wall section 192 and the passenger compartment bottom wall section 194 at the second end portion 188 of the structural member 184. With this arrangement of the first and second structural nodes 200, 202, an area of the front pillar 182 extending between the first and second end portions 186, 188 of the structural member 184 is devoid of a second separate structural member. This allows for a reduction in an overall width "Y" of the exemplary front pillar 182, which, in turn, increases a visibility angle "VA" of the front pillar 182. A sunroof drain tube, harness and airbag (all not shown) can extend through the front pillar 182 and can be secured to the structural member 184.

As further depicted in FIG. 4, the vehicle body assembly 180 includes a cowl 206 and a lower left structural member 208, each of which is connected to the first structural node 200. An end portion of a roof bow 210 and an upper portion of a left B-pillar 212 are connected to the second structural node 202. A roof extension member 216 is secured to the structural member 184 for attachment to an end portion of a front roof rail 218. It should be appreciated from FIG. 4 that the structural member 184 of the front pillar 182 defines a forward part of a roof side rail for supporting a roof structure (not shown) over the passenger compartment.

With particular reference to FIG. 3, the structural member 184 is formed by four sides, namely four wall sections 220, 222, 224, 226, so as to have a substantially rectangular closed cross-section. It should be appreciated though that substantially rectangular refers to a rectangle, a square, or another quadrilateral. By way of example, according to the depicted embodiment the structural member 184 can be made of a rectangular pipe. The four wall sections 220 through 226 are an outer upper wall section 220, an outer lateral side wall section 222 located on an outside in a vehicle width direction, an inner lower wall section 224, and an inner lateral side wall section 226 located on an inside in the vehicle width direction. The outer upper wall section 220 and the outer lateral side wall section 222 form the vehicle exterior-side wall section 190 that is substantially L-shaped in cross-section, and the inner lower wall section 224 and the inner lateral side wall section 226 form the passenger compartment-side wall section 192 that is also substantially L-shaped in cross-section. Therefore, the vehicle exterior-side wall section 190 is positioned on the structural member 184 towards an exterior of the vehicle body assembly 180. The passenger compartment-side wall section 192 is positioned on the structural member 184 towards an interior of the vehicle body assembly 180 (i.e., towards the passenger compartment).

According to one aspect, each of the first and second structural nodes 200, 202 are configured to be fastened to both the inner lower wall section 224 and inner lateral side wall section 226 of the passenger compartment-side wall section 192. By way of example, FIG. 3 depicts the first end portion 186 of the structural member 184 of the front pillar 182 secured to the first structural node 200. As shown, the first structural node 200 can include a substantially L-shaped section 230 having a first part 232 for attachment to the inner lower wall section 224 and a second part 234 for attachment to the inner lateral side wall section 226. The first part 232 includes at least one mounting aperture 236 provided coaxially with a through-hole 238 located on the inner lower wall section 224, and the second part 234 includes at least one mounting aperture 240 provided coaxially with a through-hole 242 located on the inner lateral side wall section 226. In the depicted embodiment, bolts 250 extend through the mounting apertures 236, 240 and the through-holes 238, 242 and can threadingly engage a first reinforcement 252 at least partially housed within the structural member 184. The first reinforcement 252 is secured to both the first end portion 186 of the structural member 184 and the first structural node 200. By way of example, the first reinforcement 252 can be provided with threaded sections 260, 262 (e.g., welded nuts) that are aligned coaxially with the respective through-holes 238, 242. The threaded sections 260, 262 are capable of having the bolts 250 screwed thereinto. However, in lieu of the first reinforcement 252, the through-holes 238, 242 of the respective inner lower wall section 224 and inner lateral side wall section 226 can be threaded allowing the bolts 250 to be screwed directly to the first end portion 186 of the structural member 184.

It should be appreciated that the second end portion 188 of the structural member 184 of the front pillar 182 can be secured to the second structural node 202 in a similar manner. Further, similar to the first reinforcement 252, a second reinforcement (not shown) can be configured to conform to an inner surface of the passenger compartment-side wall section 192 of the structural member 184 such that the second reinforcement is secured to both the structural member and the second structural node. The second reinforcement can be at least partially housed within the structural member 184.

According to one aspect of the present disclosure, the structural member 184 is formed of a first metal and each of the first and second structural nodes 200, 202 are formed of a second metal different than the first metal. By way of example, the first metal can be a steel or steel based alloy. The second metal can be aluminum or aluminum based alloy, allowing the first and second nodes 200, 202 to be cast in a single piece and finish machined where necessary. However, the first and second nodes 200, 202 may be formed using any suitable process or processes. To prevent galvanic corrosion between the differing first and second metals, an electrically nonconductive adhesive 270 is interposed between the first end portion 186 of the structural member 184 and the first structural node 200 (FIG. 3) and is interposed between the second end portion 188 of the structural member 184 and the second structural node 202.

As shown in FIGS. 3 and 4, the vehicle body assembly 180 further includes a windshield 280 (similar to windshield 110) mounted to the front pillar 184. An edge portion 282 of the windshield 280 is adhered directly to the vehicle exterior-side wall section 190 of the structural member via an adhesive 286. Particularly, according to one aspect, the windshield 280 includes a spacer 290 which extends toward the outer upper wall section 220 of the structural member 184. The spacer 290 is sized to engage an underside of the edge portion 282 of the windshield 280. The adhesive 286 is located laterally inward of the spacer 290.

With continued reference to FIG. 3, the front pillar 182 includes a pillar outer cover 300 disposed outwardly of the front pillar 182 and a pillar inner cover 302 disposed inwardly of the front pillar 182 in the vehicle passenger compartment or cabin. The pillar outer cover 300 can be formed of, for instance, a synthetic resin and covers the front pillar 182 located between the front door 106 and the windshield 280 from the outside. Similarly, the pillar inner cover 302 can be formed of, for instance, a synthetic resin and covers the front pillar 182 from the inside of the vehicle cabin.

The pillar outer cover 300 is secured to the exterior-side wall section 190 of the structural member 184. More particularly, the pillar outer cover or garnish 300 is secured directly to the outer lateral side wall section 222 via a first attachment member 308 configured to interconnect the pillar outer cover 300 and the outer lateral side wall section 222. In the depicted embodiment, the first attachment member 308 is separate from the pillar outer cover 300; although, this is not required. The first attachment member 308 includes a mounting section 310 and an arm section 312 extending outwardly from mounting section 310 (i.e., outwardly from the exterior-side wall section 190 of the structural member 184) toward an underside 314 of the front outer cover 300. The arm section 312 is secured to the pillar outer cover 300 inwardly of a laterally inward edge section 318 of the pillar outer cover 300. According to one aspect, the arm section 312 is adhered to the pillar outer cover 300 via an adhesive 320 applied between the arm section 312 and the underside 314. Although it should be appreciated that the pillar outer cover 300 and the first attachment member can be integrally formed as a single part thereby eliminating the need for the adhesive 320. The mounting section 310 is configured to be attached to the outer lateral side wall section 222 via a fastener, such as the depicted bolt 326.

The first attachment member 308 positions the pillar outer cover 300 relative to the exterior-side wall section 190 of the structural member 184 so that the laterally inward edge section 318 overlaps the windshield 280. The outer pillar cover 300 is also sized so that a laterally outward edge section 330 overlaps the front door glass 108 of the front door 106 which opens and closes the door opening 104. According to one aspect, a width "W" of the pillar outer cover is between 50 mm and 60 mm. With the depicted configuration of the pillar outer cover 300, and in contrast to the known garnish 160, no portion of the pillar outer cover 300 extends beneath the windshield 280. Further, the laterally inward edge section 318 is sealingly engaged to the windshield 280 via a seal member 340 secured to the laterally inward edge portion 318 of the outer pillar cover 300. As shown, the seal member 340 projects from the laterally inward edge portion 318 and seals a gap 342 between the edge portion 318 and the edge portion 282 of the windshield 280. A single door weatherseal 346 is sealingly engaged to the laterally outward edge portion 330 of the pillar outer cover 300 and is attached to the exterior-side wall section 190 of the structural member 184 via a mounting member 348. As shown, the bolt 326 can also fasten the mounting member 348 to the outer lateral side wall section 222.

According to the embodiment depicted in FIG. 3, the pillar inner cover 302 is a split inner cover having a first part 350 and a second part 352. The mounting member 348 attaches the first part 350 the outer lateral side wall section 222 of the exterior-side wall section 190 of the structural member 184. This locates the door weatherseal 346 sealingly between the pillar outer cover 300 and the pillar inner cover 302. The second part 350 is attached to the passenger compartment-side wall section 192 of the structural member 184 via a second mounting member 354.

The overall width "Y" of the exemplary front pillar 182 is depicted in FIG. 3. In contrast to the overall width of the known front pillar 120, which again is typically a distance that is dependent on the windshield construction and the joining of the weld flanges of the inner and outer members 122, 124, the overall width of the front pillar 182 is defined by a width of the pillar inner cover 302 which can be reduced by use of the exemplary structural member 184. By way of example, the overall width "Y" of the exemplary front pillar 182 is between 85 mm and 90 mm. Further, because the pillar outer cover 300 overlaps the windshield 280, the bond area between the structural member 184 and the windshield 280 can be reduced, thus further increasing the visibility through the front pillar 182. As indicated previously, the width of the pillar inner cover 302 also defines the visibility angle "VA" of the front pillar 182 relative to the position of the operator of the vehicle, and the visibility angle is also increased with use of the exemplary front pillar 182. Further, with the windshield 280 being adhered to the structural member 184 and the roof extension member 216, the visual field through the windshield 320 is increased.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle body assembly comprising:
a front pillar extending at an incline rearwards and upwards to form a first part of a door opening, the front pillar including a tubular structural member which is a single integrated component having a closed cross-section, the structural member defining a vehicle exterior-side wall section and a passenger compartment-side wall section;
a windshield adhered to the vehicle exterior-side wall section of the structural member;
a roof rail extending rearwards to form a second part of the door opening, the roof rail defined by the structural member; and
a pillar outer cover disposed outwardly of the front pillar and secured to the exterior-side wall section of the structural member, the pillar outer cover including an edge section overlapping and sealingly engaged to the windshield.

2. The vehicle body assembly of claim 1, wherein the vehicle exterior-side wall section is defined by an outer upper wall section and an outer lateral side wall section located on an outside in a vehicle body width direction, and the passenger compartment-side wall section is defined by an inner lower wall section and an inner lateral side wall section located on an inside in the vehicle body width direction.

3. The vehicle body assembly of claim 2, wherein the pillar outer cover is secured directly to the outer lateral side wall section of the structural member.

4. The vehicle body assembly of claim 3, including an attachment member interconnecting the pillar outer cover and the outer lateral side wall section.

5. The vehicle body assembly of claim 4, wherein the attachment member is separate from the pillar outer cover and includes an arm section extending outwardly from the exterior-side wall section of the structural member, the arm section being one of adhered to the pillar outer cover inwardly of the edge section of the pillar outer cover.

6. The vehicle body assembly of claim 4, wherein the attachment member is integrally formed with the pillar outer cover to define a unitary part, the attachment member including an arm section located inwardly of the edge section of the pillar outer cover and extending outwardly from the exterior-side wall section of the structural member.

7. The vehicle body assembly of claim 1, including a seal member secured to the edge portion of the outer pillar cover and sealingly engaging the windshield.

8. The vehicle body assembly of claim 1, wherein the windshield is adhered directly to the vehicle exterior-side wall section of the structural member.

9. The vehicle body assembly of claim 8, wherein a spacer engages an underside of the windshield, and an adhesive adhering the windshield to the vehicle exterior-side wall section is located inwardly of the spacer.

10. The vehicle body assembly of claim 1, including a pillar inner cover disposed inwardly of the front pillar, the pillar inner cover is a split inner cover having a first part attached to the exterior-side wall section of the structural member and a second part attached to the passenger compartment-side wall section of the structural member.

11. The vehicle body assembly of claim 10, including a door weatherseal located between and sealingly engaged to both the pillar inner cover and the pillar outer cover.

12. The vehicle body assembly of claim 11, including a mounting member attaching the door weatherseal to the exterior-side wall section of the structural member, the first part of the pillar inner cover being attached to the mounting member.

13. The vehicle body assembly of claim 10, wherein the pillar inner cover defines a width and visibility lines of the front pillar, the width being between 85 mm and 90 mm.

14. The vehicle body assembly of claim 13, wherein a width of the pillar outer cover is between 50 mm and 60 mm.

15. A vehicle body assembly comprising:
a front pillar extending at an incline rearwards and upwards to form a part of a door opening, the front pillar including a tubular structural member being a single integrated component having a closed cross-section and defining a vehicle exterior-side wall section and a passenger compartment-side wall section, the vehicle exterior-side wall section being defined by an outer upper wall section and an outer lateral side wall section located on an outside in a vehicle body width direction, and the passenger compartment-side wall section being defined by an inner lower wall section and an inner lateral side wall section located on an inside in the vehicle body width direction;
a windshield adhered directly to the outer upper wall section of the vehicle exterior-side wall section of the structural member; and
a pillar outer cover disposed outwardly of the front pillar and secured to the outer lateral side wall section of the exterior-side wall section of the structural member, the pillar outer cover including an edge section overlapping and sealingly engaged to the windshield, wherein no portion of the pillar outer cover extends beneath the windshield.

16. The vehicle body assembly of claim 15, including an attachment member interconnecting the pillar outer cover and the exterior-side wall section of the structural member, the attachment member including an arm section adhered to the pillar outer cover.

17. The vehicle body assembly of claim 15, including a seal member secured to the edge portion of the outer pillar cover and sealingly engaging the windshield.

18. The vehicle body assembly of claim 15, wherein the edge section of the pillar outer cover is a first edge section, and the pillar outer cover includes a second edge section overlapping a front door glass of a front door which closes the door opening, and including a door weatherseal sealingly engaged to the second edge portion of the pillar outer cover.

19. A front pillar structure for a vehicle body comprising:
a unitary, one-piece tubular structural member having an outer upper wall section, an outer lateral side wall section, an inner lower wall section and an inner lateral side wall section;
a pillar outer cover disposed outwardly of the structural member and an attachment member adhered to the pillar outer cover and configured to secure the pillar outer cover to the outer lateral side wall section of the structural member, the pillar outer cover configured to overlap and sealingly engage an associated windshield adhered directly to the structural member; and
a pillar inner cover disposed inwardly of the structural member and a mounting member configured to secure the pillar inner cover to the outer lateral side wall section.

20. The front pillar structure of claim 19, including a seal member secured to an edge section of the outer pillar cover and configured to sealingly engage the associated windshield.

* * * * *